United States Patent [19]

Blake et al.

[11] 4,227,513
[45] Oct. 14, 1980

[54] SOLAR SYSTEM HAVING IMPROVED HELIOSTAT AND SENSOR MOUNTINGS

[75] Inventors: Floyd A. Blake, Littleton, Colo.; Lynn L. Northrup, Jr., Dallas, Tex.

[73] Assignee: Atlantic Richfield Company, Los Angeles, Calif.

[21] Appl. No.: 953,469

[22] Filed: Oct. 23, 1978

[51] Int. Cl.³ .................................................. F24J 3/02
[52] U.S. Cl. ...................... 126/425; 126/438; 353/3; 250/203 R; 350/289
[58] Field of Search ............... 126/270, 271, 424, 425, 126/438, 451; 60/641; 343/890, 761; 353/3; 250/203 R; 350/289, 203 R

[56] References Cited

U.S. PATENT DOCUMENTS

| 787,145 | 4/1905 | Brown | 126/271 |
|---|---|---|---|
| 3,194,966 | 7/1965 | Hulett | 250/203 R |
| 3,861,379 | 1/1975 | Anderson, Jr. | 353/3X |

OTHER PUBLICATIONS

*Solar Energy Technology and Applications*, J. Richard Williams, 1974, Ann Arbor Science Publishers, pp. 49-50.

Primary Examiner—Samuel Scott
Assistant Examiner—Lee E. Barrett
Attorney, Agent, or Firm—Wofford, Fails & Zobal

[57] ABSTRACT

This specification discloses an improvement in a solar system having one or more collectors for receiving and using radiant energy from the sun and at least one and preferably a plurality of respective reflector means for reflecting the radiant energy onto the collectors. The improvement is characterized by having each reflector in the form of a heliostat that can be moved to maximize the radiant energy reflected onto its collector, driving motor for so moving each heliostat; firmly anchored support structure carrying each heliostat; and sensor connected by suitable controls with each drive motor for so moving each heliostat; the respective sensor being mounted on the same support structure as the heliostat and aligned in a straight line from the heliostat to its collector. With this construction, the sensor does not require an expensive and firmly anchored separate support structure to prevent receiving small surface movements different from those received by the heliostat.

5 Claims, 5 Drawing Figures

SOLAR SYSTEM HAVING IMPROVED HELIOSTAT AND SENSOR MOUNTINGS

BACKGROUND OF THE INVENTION

1. Field of the Invention

This invention relates to solar systems employing reflectors for reflecting radiant energy onto one or more collectors. More particularly, this invention relates to an improvement in the solar system having the reflectors and collector in which the expense of installation is reduced without sacrificing precision and efficiency.

2. Background of the Invention

The prior art has seen the development of a wide variety of systems for producing useful work. One of the systems that has long been used but has been recently reactivated with a special emphasis is the use of solar energy. The systems for using the solar energy are referred to as solar systems. These systems have taken a wide variety of forms ranging from the photovoltaic cells that convert the radiant energy directly into electrical current, such as used in space probes, space vehicles and the like; to the more mundane systems converting the energy to heat for heating a fluid for use in generation of power. Regardless of which system is employed, it is generally conceded to be beneficial to employ a concentrating principle in which the sun's radiant energy from a much larger area than the collector, per se, is directed, or focused, onto the collector that uses the radiant energy.

In a typical installation at the surface of the earth, a collector may be mounted on a tower or the like and reflectors spaced thereabout for directing radiant energy onto the collector. In order to maximize the radiant energy directed onto the collector, a sensor has been employed intermediate the collector and the reflector so as to detect when the sun rays depart from the most direct and concentrated reflection of the radiant energy onto the collector. Typically in such an installation, the reflector was mounted on one support structure, such as a post that was firmly anchored in the surface of the earth or the like. In order to resist receiving minor surface movements, the sensor then had to be mounted on a similarly rigidly anchored support structure. Since the anchors had to go down to subsurface layers to resist the surface movements that might be spurious or different one from the other, the second support structure was expensive.

Accordingly it can be seen that the prior art was not totally satisfactory in providing an economical combination of reflector, collector, sensor and their respective supports.

SUMMARY OF THE INVENTION

Accordingly, it is an object of this invention to provide a solar system that is more economical than the prior art systems, yet does not sacrifice efficiency.

It is a specific object of this invention to provide a solar system in which there is employed a collector for using the radiant energy, a reflector for reflecting radiant energy onto the collector, a sensor for maximizing the reflected energy and support for the respective elements of the system that was more economical than the prior art and that resisted receiving different surface movements by the sensor and reflector.

These and other objects will become apparent from the descriptive matter hereinafter, particularly when taken in conjunction with the appended drawings.

In accordance with this invention, there is provided an improvement in a solar system located on the surface of the earth exposed to the sun and including at least one receiving collector for receiving and using the radiant energy from the sun and at least one reflector means for reflecting the radiant energy from the sun onto the collector. The improvement comprises having the reflector in the form of a heliostat that can be moved to maximize its reflected radiant energy onto the collector; means for moving the heliostat to maximize the radiant energy; a support structure carrying the heliostat; the support structure being anchored firmly in the surface; and a sensor connected with the means for moving the heliostat for maintaining the maximim radiant energy onto the collector; the sensor being mounted on the support structure and aligned with a straight line from the heliostat to the collector and disposed so as to sense reflected radiant energy from the heliostat and respond by generating an error signal when the light received is not at its maximum and not uniform over the total sensing surfaces of the sensor; the sensor not requiring an expensive, firmly anchored separate support structure to prevent receiving small surface movements different from those received by the heliostat.

DESCRIPTION OF PREFERRED EMBODIMENTS

It is immaterial in this invention whether the collector be of photovoltaic cells for converting the radiant energy directly to electricity or converting the radiant energy to heat, as for heating a fluid that will ultimately be used in the generation of power. The latter application is easily understood and this invention will be described in this context.

Figure 1:
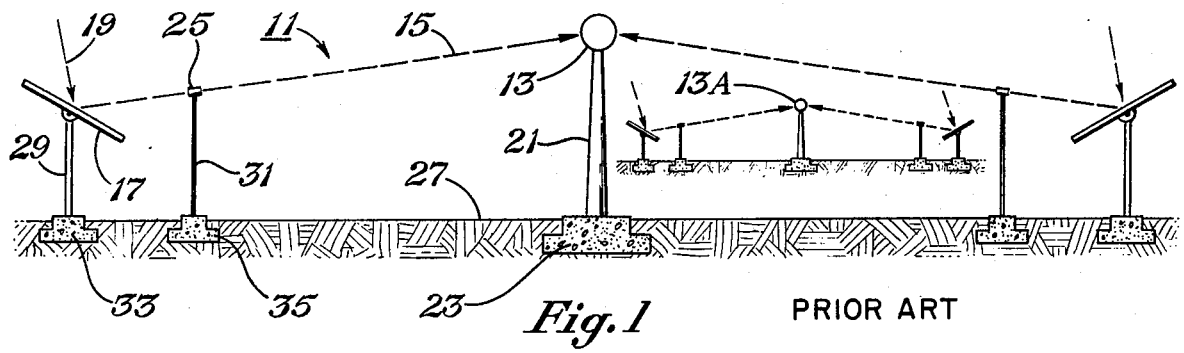
FIG. 1 is a partial side elevational view, partly schematic, showing the prior art arrangement of collector, reflector and sensor and their respective supporting structures.

Referring to FIG. 1, the solar system 11 includes a collector 13 for receiving and using the radiant energy from the sun, shown by the ray 15. The solar system 11 also includes at least one reflector means 17 for reflecting the sun's radiant energy, shown by ray 19, onto the collector 13. Ordinarily, in the prior art, the collector 13 is supported on a tower 21 to facilitate receiving the radiant energy from a plurality of the reflector means 17 spaced about the collector 13.

The collector 13 may be a steam generator or the like for heating a fluid directly; for example, to convert water into steam to be used in passing through turbines for generating electricity by rotating generators or the like. Alternatively, the collector 13 may absorb the radiant energy and heat an oil or other high boiling liquid that will be passed in heat exchange relationship with the water to generate the steam. How the collector 13 uses the radiant energy is relatively immaterial to this invention.

The tower 21 is structurally adequate to hold the collector 13 against the ambient winds and the like. Ordinarily, the tower 21 will comprise linear structural elements that are connected together to form a rigid unitary mast that is anchored in suitable foundation 23. As indicated hereinbefore, the collector 13 may be merely a module for heating an oil or the like so as to require less structural support. A great deal depends upon the temperature that is desired to be obtained in the collector 13. These temperatures may range from as low as about 200 degrees Fahrenheit (93° C.) to as high as 1500 degrees Fahrenheit (816° C.). Of course, the design will vary significantly between these extremes.

It is ordinarily when temperatures in excess of a few hundred degrees Fahrenheit is desired that it becomes imperative to try to maximize the radiant energy absorbed, or reflected onto the collector 13. In such instances, respective sensors 25 are disposed intermediate the reflector means 17 and the target, collector 13. The sensors 25 detect when the most intense radiation for a given condition is being received. The sensors may comprise any of those commercially available. It has been found in this invention advantageous to employ dual tube sensors having photovoltaic cells arranged in matched pairs at the base of an elongate tube. The open end of the tube faces directly into the reflector means 17. As long as there is uniform lighting on the cell surfaces, the cells are matched and no error signal is generated. Once the sun moves such that there is non uniform lighting or shadowing of one or more of the cells, an error signal is generated, causing the reflector means to be positioned at a new angle to effect best focusing of the sun's rays onto the collector 13. As will be appreciated, it is critical that the sensor 25 always be correctly and carefully aligned with the center of the reflector means 17 and the target 13.

Consequently, in the prior art, the sensor 25 was as firmly mounted in the surface 27 as was the reflector means 17. Expressed otherwise, the support structures 29, 31 and foundations 33, 35 were both firmly anchored sufficiently deep that both the sensor 25 and the reflector means 17 receive the same movements and there were no spurious surface movements received by either one alone. Ordinarily, each supporting structure 29 and 31 comprised relatively large steel posts designed to resist movement by ambient winds and the like. Respective foundations 33 and 35 were formed of concrete and penetrated into the subsurface layers of the earth deeply enough to resist spurious movement of the surface layers, as from expansion of clays or the like when wet by rain.

While only the pair of the diametrically opposite reflector means and sensors are illustrated, it is to be remembered that any desired array of the reflector means can be employed with respect to one or more collectors 13, 13a. For example, the reflector means may be placed in an array throughout 360 degrees around each collector.

Figures 2, 2A, 3:
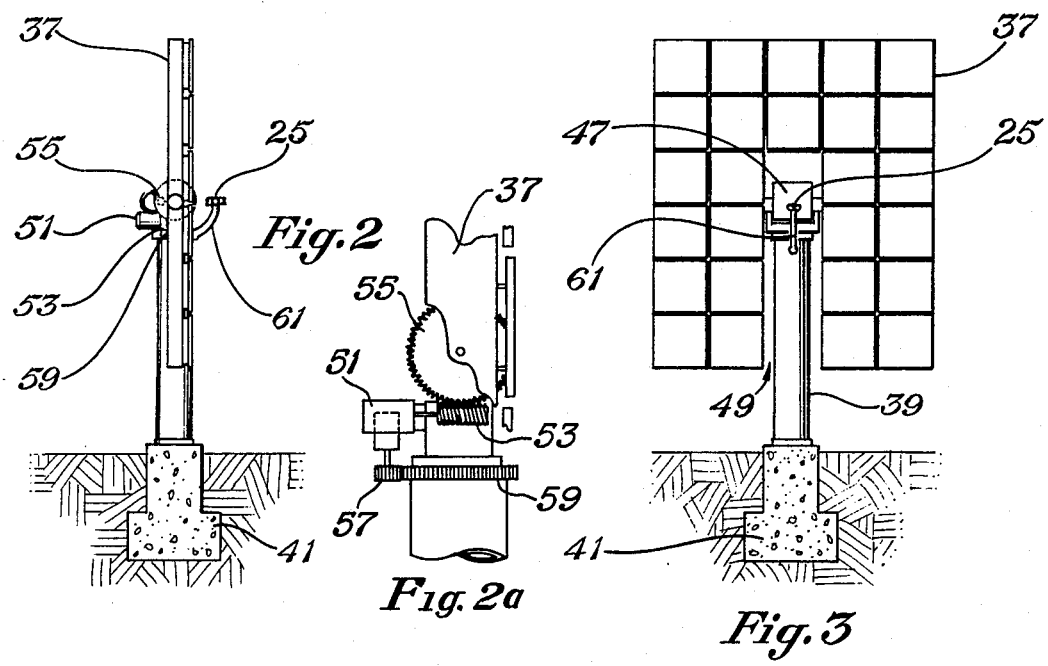
FIG. 2 is a side elevational view of the improvement of this invention.
FIG. 2a is a side elevational view showing greater details of a drive mechanism.
FIG. 3 is a front elevational view of the improvement of FIG. 2.
Figure 4:
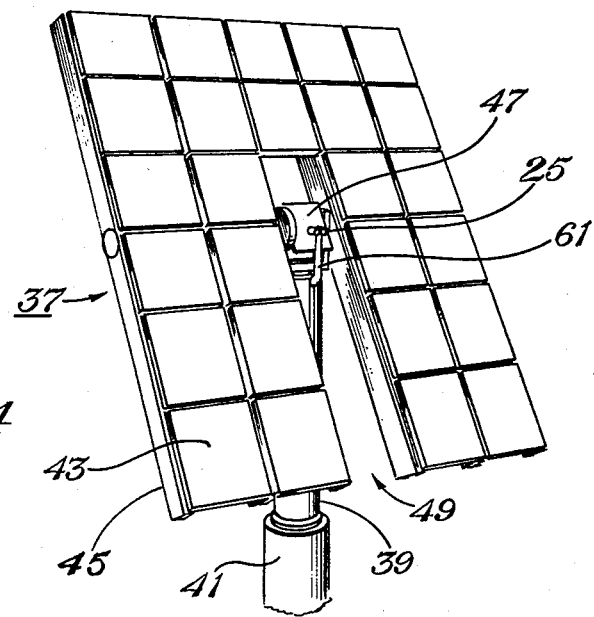
FIG. 4 is a partial perspective view of the improvement of FIG. 2 in operating position.

Referring to FIGS. 2-4 for the improvement in accordance with this invention, the reflector means 17 is in the form of heliostat 37 with both it and the sensor 25 being carried by the supporting structure, or post, 39. The post 39 is, in turn, carried by the foundation 41. Ordinarily, a plurality of heliostats are employed for reflecting the radiant energy onto a given respective collector 13. The respective heliostats may have any suitable dimension and form. For example, the heliostat may comprise an arcuate reflector means, such as a mirror, to convert the substantially parallel rays from the sun into focussed rays that converge on the collector 13. As illustrated, each heliostat is about 24 feet (9.7 meters) tall and about 20 feet (6.1 meters) wide on each single post structure. Focusing is obtained by aligning a plurality of relatively small; for example four feet by four feet (1.2 meters by 1.2 meters) flat facets into a Fresnel approximation of a spherical concentrator. Each facet has a reflecting surface of a mirrored glass plate for utmost reflectivity. The mirroring may be of conventional design, such as aluminum or silver.

Second surface silvering has proven to be the most durable and best reflective material found. The making of the individual flat facets involves only state of the art technology and need not be detailed herein.

As can be seen in FIG. 4, the illustrated facets 43 are arranged in rows and columns and are supported by structural elements 45 in a unitary array of 26 facets. The heliostat 37 has a central reflector 47. The heliostat 37 has a slot 49 below the central reflector 47 so as to be pivoted without hitting the post 39 or connected elements. The heliostat 37 is light in weight. Accordingly, the structural elements are preferably formed of a light weight metal such as aluminum, magnesium, or the like, although steel is frequently employed because it is high strength. The facets 43 are affixed to the structural elements by any suitable means, as by bonding or the like. Preferably, the reflecting area is maintained at or near the maximum.

As illustrated, the heliostat 37 is movable pivotally about a horizontal axis through the central reflector 47 to accommodate, primarily, the daily path of the sun. If desired, the heliostat 37 also may be radially movable about a vertical axis passing through the central reflector 47. The radial movement is through a limited arc to accommodate the 23½ degrees variance between the sun's path during the different seasons.

The means for moving the heliostat to maximize the radiation towards the collector 13, includes a motor 51 and worm gear drive 53, serving as an elevation drive means for pivoting the heliostat about its horizontal axis through the central reflector 47. The worm gear acts on the circular pinion 55 in attaining and holding a desired angle. The worm gear serves as a braking means so as to resist movement of the heliostat once a given signal is obtained.

If the heliostat is to be rotated about the vertical axis through the central reflector 47, a suitable motor, gear reducer and rack 57, FIG. 2a, may be employed engaging a circular pinion 59 for effecting the rotation about the vertical axis.

The respective motors, worm gear drives, gear reducers, racks and pinions are all well known and are conventionally available so need not be detailed herein.

With respect to the foregoing, it is sufficient to note that the slot 40 enables the heliostat to be pivoted or rotated through its limited arc without striking the sensor 25 or its cantilever mounting member 61.

Specifically, the sensor 25 is a dual tube sensor such as described hereinbefore employing two sets of photovoltaic cells each with the cells matched to balance each other when each are receiving the same intensity of light. In the event that there is a moving of the sun without corresponding movement of the heliostat, one of the cells suffers a loss of intensity. Consequently, an error signal is generated that causes the motor to pivot the heliostat 37 to bring the intensity of radiation back to its maximum and achieve a uniform distribution of light over the photovoltaic cells. The respective cells of a matched pair indicates the nature of the correction to be made; for example, greater tilting of the heliostat. The use and connection of the sensor, controls and motor driven means is conventional and need not be delineated in detail herein. The conductors from the sensor 25 are usually run interiorly of cantilever mounting member 61.

The sensor 25 is carried by the cantilever mounting member 61; which in turn, is affixed, as by welding, to the post 39. The cantilever mounting member 61 is structurally adequate to retain the sensor 25 in place against ambient winds or the like. When the conductors are run interiorly of the member 61, it is tubular with passage through its interior. Otherwise, member 61 can be of any desired shape. Preferably, both the cantilever mounting member 61 and the sensor 25 resist destructive effects of weather, such as, the destructive effects of sun, rain, ice or the like. This cantilever mounting member 61 may be affixed by any suitable means to the post 39 as long as it is structurally adequate to move in unison with the post 39 and heliostat 37, and not be moved by other forces such as wind or the like. It is readily apparent that, as closely mounted as the sensors are to the heliostat, small movements are reflected as large movements of the reflected rays by the time the radiant energy is at the distance of the collector 13.

The heliostat sensor assembly will survive earthquake environment experienced in the continental United States. Reattainment of performance following earth movement is achieved with minor aiming adjustments. The mirrors are readily maintained because of the flat unstressed shape of the glass.

In operation, the collector is installed in the conventional fashion. The foundation 41 is poured and the post 39 attached thereto, as by bolts through a flanged plate or the like. The heliostat 37 is pivotally mounted on the top of the post 39 with its slot 47 disposed about and encompassing the post 39. The respective means for moving the heliostat are interconnected with the suitable gears and pinions meshing. The sensors 25 and the cantilever mounting members 61 are then emplaced so as to detect the rays aimed at the collector 13. Thereafter, suitable controls are connected and activated to pivot the heliostat 37 to the desired angle for the sun at any given point and calibration of the sensors 25 is made.

As a consequence of the error signals, the heliostat is moved as the sun moves in its trajectory across the heavens to maximize the radiant energy reflected onto the collector 13 for a given heliostat 37. If desired, the elevation drive means may be connected to a timer or the like to bring the heliostat back into its initial position for receiving the morning rays of the sun. Corrections may be made by manual override control in the event of a malfunction.

The conventional controls may be employed for testing the circuits of the sensors and or the control circuits of the respective motors.

It is sufficient to note that by the respective one or more movements of the heliostat 37 about its respective axes through the central reflector 47, the radiant energy directed toward the collector 13 is maintained at a maximum and the efficiency is maintained near the maximum.

One of the particular advantages of this structure is that the heliostat may be oriented horizontally, face down for minimum wind resistance from any direction in the event there is a storm or the like. Moreover, the effects of a storm on the post 39 are reflected in the same relative positioning of both heliostat and sensor 25 such that only minor alteration is required in the events there is movement. This is in contrast to the prior art where movement of the heliostat frequently could have required major work to correct the orientation of the heliostat post or the separate post containing the sensor 25.

From the foregoing it can be seen that this invention achieves the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:

1. In a solar system on the surface of the earth and exposed to the sun and having:
   a. at least one energy receiving collector for receiving and using radiant energy from the sun; and
   b. at least one reflector means for reflecting said radiant energy from the sun onto said collector;
   the improvement comprising:
   c. having said reflector means in the form of a heliostat that can be moved to maximize its reflected radiant energy onto said collector and configured so as to avoid interference with a co-mounted sensor;
   d. means for moving said heliostat to maximize said radiant energy reflected on the said collector and through arcs that will not interfere with a co-mounted sensor;
   e. dual purpose support structure carrying said heliostat and a sensor; said support structure being anchored firmly in the surface; and
   f. a sensor controllably connected with said means for moving said heliostat for maintaining the maximum radiant energy reflected onto said collector; said sensor being mounted on said support structure and aligned with a straight line from said heliostat to said collector such that said sensor does not require an expensive, firmly anchored separate support structure to prevent receiving small surface movements different from those received by said heliostat;

said heliostat having a central reflector; said heliostat adapted to be pivotably rotatable about a horizontal axis and a vertical axis through said central reflector such that the central perpendicular axis of said central reflector bisects and lies in the plane of the angle between the lines to, respectively, the sun and the collector so as to correct for both time, and seasonal diurnal movements of the sun and maximize the solar energy reflected onto said collector; said sensor being cantilevered from said support structure below said central reflector and aligned between the center of said central reflector and said collector; said heliostat having a slot below said central reflector so as to be pivoted without hitting said support structure and said sensor and cantilever mounting; said means for moving said heliostat including an elevational drive means for pivoting said heliostat to a desired angle about said horizontal axis; and said means for moving said heliostat including a rotation means for rotating said heliostat through a limited arc about said vertical axis.

2. The solar system of claim 1 wherein said support structure comprises a dual purpose post means that is anchored by a firm foundation.

3. The solar system of claim 1 wherein said sensor comprises dual tube sensors for improved reliability.

4. The solar system of claim 1 wherein there are a plurality of respective heliostats and sensors mounted on respective said support structures; each heliostat being directed at said collector so as to reflect said radiant energy thereonto.

5. The solar system of claim 1 wherein there are a plurality of said collectors, each having a plurality of said heliostats directed thereat; each said heliostat having its respective said sensor mounted on its respective said support structure.

* * * * *